Figure 1:
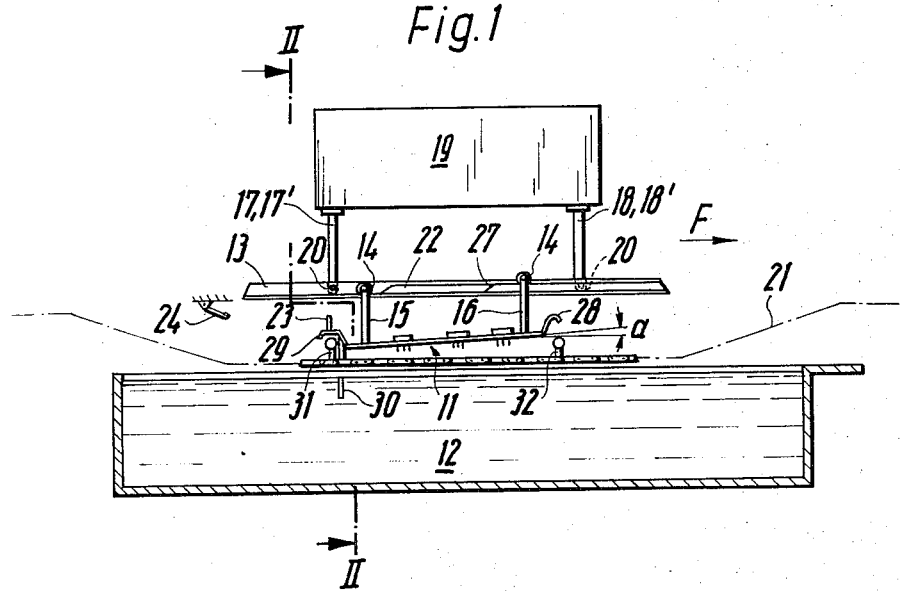

United States Patent [19]
Wanner

[11] 3,828,419
[45] Aug. 13, 1974

[54] AUTOMATIC SOLDERING MACHINE

[75] Inventor: Rudolf Wanner, Arolsen, Germany

[73] Assignee: Zevatron, GmbH, Arolsen, Germany

[22] Filed: Sept. 26, 1972

[21] Appl. No.: 292,283

[30] Foreign Application Priority Data
Sept. 29, 1971 Germany............................ 2148680

[52] U.S. Cl.................... 29/503, 118/400, 228/36, 228/40
[51] Int. Cl............................................. B23k 31/02
[58] Field of Search.................. 228/33, 36, 37, 40; 118/259, 400; 29/484, 503

[56] References Cited
UNITED STATES PATENTS

| | | | |
|---|---|---|---|
| 3,226,821 | 1/1966 | Van Dijk et al. ................. | 228/36 X |
| 3,386,166 | 6/1968 | Tardoskegyi..................... | 228/36 X |
| 3,439,854 | 4/1969 | Walker ............................. | 228/37 X |
| 3,445,919 | 5/1969 | Saba ................................. | 228/37 X |
| 3,713,876 | 1/1973 | Lavric............................... | 29/503 |
| 3,721,379 | 3/1973 | Corsaro ............................ | 228/40 X |

*Primary Examiner*—J. Spencer Overholser
*Assistant Examiner*—Robert J. Craig
*Attorney, Agent, or Firm*—Watts, Hoffmann, Fisher & Heinke Co.

[57] ABSTRACT

An automatic soldering machine in which objects to be dip soldered or touch soldered are carried by holders and moved by a conveyor into and out of contact with a molten solder bath. Guide rails selectively adjustable in position during a soldering cycle control the path of movement of the holder in the area of the solder bath. Cam actuators on the holder operate switches to establish a desired programmed movement of the guide rails, and conveyor.

21 Claims, 2 Drawing Figures

AUTOMATIC SOLDERING MACHINE

BACKGROUND OF THE INVENTION

1. Field of the Invention

This invention relates to an automatic soldering machine and more particularly to such a machine having a conveyor which carries the objects to be soldered on holders to a soldering bath where they are brought into contact with the liquid solder, and which subsequently moves them away from the soldering bath.

2. Prior Art

The touch soldering machines developed in recent years have reached an output level which is so high that it is only rarely that the known machines can be loaded at a rate corresponding to the possible production output. The main reason for this lies in the fact that different soldering methods have to be applied to different soldering jobs, which in the case of the known machines leads to considerable periods of time for changing-over from one process to another.

SUMMARY OF THE INVENTION

In order to resolve this problem, the invention provides for at least one guide rail located over the soldering bath and extending in the direction of conveyance, which can be raised and lowered in a controlled manner and which carries workpiece holders by means of guide members. In this way, by appropriate raising and lowering of the rail and by variations in the speed of conveyance or by temporary stopping of the conveyor, any desired soldering processes may be performed. The length of the guide rail or rails, as when two are located side by side, is such that only one single holder can at any time be located on the rail or rails. In this way, individual soldering treatment of the object located on the holder is possible. If necessary, however, it is also possible for a plurality of holders to be simultaneously located on the rails, if the objects located on these holders all require the same soldering treatment.

According to the invention, therefore, in any desired sequence, it is possible to perform pure touch solderings, pure dip solderings or also combined touch-dip soldering operations. In this connection, the possible use of the thick film technique, which is gaining ever-increasing importance in electronics, is worth particular mention.

The essential advantages of the soldering machine according to the invention reside in the fact that it operates extremely economically and can be used for both touch and for dip soldering.

Preferably, two parallel guide rails are provided, both guide rails being expediently raisable and lowerable jointly. It is particularly advantageous if the guide rails can be tilted about a horizontal axis located transversely to the direction of conveyance. In this way, it is also possible for example for a conductor board to be carried at a definite angle of entry and exit over the soldering bath, the angle of exit being particularly important. Therefore, the preferred embodiment additionally permits a suitable adjustment the angles.

According to a further form of embodiment, the two adjacently disposed guide rails can be raised and lowered separately, so that tipping about the longitudinal axis is also possible.

Preferably, extending laterally forward and rearward from the holder, there are upwardly oriented supporting bars on which there are rollers which run on the rails. In this way, a definite angle of entry and/or exit can initially be adjusted and then further modified by tilting of the guide rails.

According to a further form of embodiment, each guide rail is connected to two places, at an interval from each other in the direction of conveyance, to lifting bars. The lifting bars are expediently disposed to be raisable and lowerable. In this case, the lifting bars should advantageously project into a housing located above the rails for a drive and gear mechanism for the bars. According to the invention, four lifting rods are provided, by the suitable raising and lowering of which all soldering works can be carried out in the desired manner.

Preferably, the rails are connected to the lifting bars so as to be movable about transverse axes.

Expediently, the front and rear lifting bars can be raised or lowered independently of one another, while the adjacent laterally disposed lifting bars are preferably jointly raisable and lowerable.

The holders should be so connected to a conveyor chain that, in the region of the rails, the holders can be freely raised and lowered by the conveyor chain but also entrained by the chain.

A further refinement in the adaptation to different soldering problems is achieved by the speed of conveyance being regulable.

Instead of the rails, the soldering bath can be located to be raised and lowered. Adjustment of the angle of inclination of the holder is preferably still achieved by the rails.

So that each holder can itself adjust what is its optimum soldering programme, the holders have switching cams which cooperated with switches located in front of the soldering bath, considered in the direction of conveyor movement. The switches operated then trigger the suitable soldering programme, i.e., conductor boards carried by the holders are moved into and out of the soldering bath at definite angles, being dipped into the soldering bath, stopped, raised etc.

According to the invention, accessory arrangements may be provided which allow the dwell time and regulability of the depth of immersion to be adjustable. Furthermore, it is possible for the acceleration of the lifting speed and for example the dwell at an adjustable point on the lifting path to be adjustable to a definite period of time. Thus, for example, the end of a wire-wrap pin can stay substantially longer in the bath without this constituting a thermal loading on the conductor panel in which the pin is mounted. In this way, there need be no substantial thickening of the tinning at the end of the pin. Namely, with a hotter pin, the run-off speed of the solder is greater.

Finally, the soldering machine according to the invention makes it possible for a horizontal transport movement to be performed during vertical lifting, the horizontal movement being in turn variable so that an optimum resultant tear-off speed can be adjusted between vertical and horizontal movement for the particular situation that exists.

The electrical connection of the dip soldering apparatus according to the invention to a power source of the touch soldering plane is expediently accomplished through a multi-core cable with a multiple plug, so that attachment and dismantling can be undertaken in a very short time.

The lifting device may be operated pneumatically, hydraulically or mechanically.

Preferably, the lifting device is controlled electronically for optimum movements of the conveyor and of the lifting apparatus for the particular soldering problem involved. A basic object of the present invention is the provision of a soldering machine which makes it possible to carry out soldering operations according to any desired processes on a continuous conveying basis, without any discontinuance of operation during the changeover from one soldering method to another.

Figure 2:
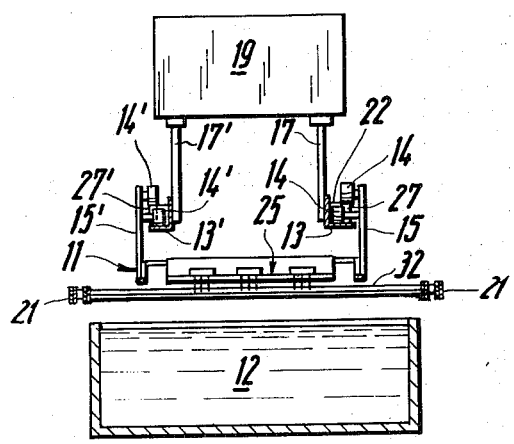

By way of example, a preferred embodiment of the invention is described hereinafter, with reference to the attached drawings, in which:

FIG. 1 is a diagrammatic partly sectional side view of an automatic soldering machine according to the invention and FIG. 2 is a section along the line II—II in FIG. 1.

According to the drawings, a holder 11 supports a printed circuit board 25, for conveyance. Carrying bars 15, 16 extend vertically upward from the holder. Rollers 14 at the upper ends of the carrying bars co-operate with guide rails 13, 13' which are parallel and extend substantially horizontally in the direction of conveyance. Preferably, the rails 13, 13' are subdivided into two parallel-extending and laterally displaced partial rails and the front and rear rollers 14 are so staggered laterally that for example the inner partial rails co-operate with the rear rollers while the outer partial rails co-operate with the front rollers. The outer partial rails have run-up ramps 27 onto which the front rollers 14 are run, so that with the rails 13, 13' horizontal and the front rollers on the outer partial rails as shown in FIG. 1, the holder encloses the small angle a with the horizontal. Similarly, according to the invention, the inner partial rails also have run-on ramps 22 located farther to the rear than the ramps 27, considered in the direction of conveyance. Where desired, the angle of rise of the run-up ramps on the inner and outer partial rails can be different to control the movement of the holder. The relative position of the partial rails on each side can also be varied in the longitudinal direction to affect the path of movement of the holder.

Beneath the guide rails 13, 13' is the soldering bath 12 which is not only sufficiently broad and long for the holder 11 to have adequate space therein, but also for touch soldering to be feasible.

As shown in FIG. 2, there are on both sides of the holder 11 carrying bars 15, 15' and rollers 14, 14'. Similarly, parallel with the double guide rail 13 which can be seen in FIG. 1 there is a second equivalent double rail 13'.

Through articulations 20, such as transversely extending spindles, the rails 13, 13' are connected to lifting bars 17, 17' and 18, 18', which project into an overhead housing 19 in which there are drive and gear elements (not shown) connected to move the lifting bars 17, 18 independently upwards and downwards in a controlled manner. However, the lifting bars 17, 17' are preferably movable together with the lifting bars 18, 18', in one mode of operation so that the articulations 20 in that case become unnecessary and rigid connections can be substituted. The lifting bars are connected at two places along each rail, spaced from each other in the direction of conveyance.

The holder 11 is driven in the direction F by a diagrammatically illustrated conveyor chain 21 on which there are at definite intervals drive bars 31, 32 which normally co-operate with a drive bow 28 or a brace 29. In the position illustrated, however, the guide rails 13, 13' carry the holder 11, the rear drive bar 31 engaging on a vertically downwardly extending plate 30 and thus driving the holder 11. The plate extends downward sufficiently so that if the chain moves downward it will continue to drive the holders hanging on the guide rails 13, 13'.

Located on the holder 11 are switching cams 23 which so co-operate with switches 24 that a suitable soldering programme can be switched on immediately before the soldering zone is entered. Of the switching cams 23 and the switches 24, in each case only one is illustrated by way of example.

The soldering machine according to the invention functions as follows: firstly, the holder 11 provided for a definite soldering problem is loaded with the object or objects to be soldered. It is then carried in front of the soldering bath 12 onto the drive bars 31, 32 which move it on to the guide rails 13, 13'. As soon as the holder 11 is located completely on the rails 13, 13', the switching cams 23, by actuating the switches 24, trigger the optimum switching programme for the objects to be soldered. The lifting bars 17, 17', 18, 18', are operated under control of the program and begin to lower the holder 11 at the desired speed and at the desired angle and raise it again. The control system also includes the ability to regulate the speed and to temporarily stop the conveyor chain 21. By lowering and raising the forward bars 18, 18' to a different extent than the rearward bars 17, 17', the guide rails can be tilted about a horizontal axis located transversely to the direction of conveyance. By lowering or raising one rail 13, 13' to a different extent than the other, the carrier can be tilted about an axis extending in the general direction of travel.

If touch soldering is required, then according to the invention holders 11 without carrier bars 15, 16 are used, whereby, by virtue of the location of the guide rails 13, 13' according to the invention, these latter do not interfere with the touch soldering process.

By virtue of the very simple and clearly constructed soldering machine, therefore, in practice all dipping, touch and combined soldering problems can be resolved with optimum results.

I claim:

1. In an automatic soldering apparatus including a plurality of holders for objects to be soldered, and a variable speed conveyor for moving the holders along a conveying path to a soldering bath where the objects are touch soldered by dragging through liquid solder and are then moved away, the improvement comprising: at least one guide rail disposed along the conveying path and adjacent the soldering bath, means to raise and lower the guide rail in a controlled manner, and guide elements attached to some of the holders, said guide rail engaging said guide elements on those of said holders having said guide elements for intercepting and at least partially controlling the motion of said holders having guide elements across said soldering bath, to provide for dip soldering of the objects on said intercepted holders, said guide rails avoiding interception of those holders not having said guide elements, so that said non-intercepted holders are permitted to move solely under the control of the conveyor in order to effect touch soldering of the objects on the non-intercepted holders.

2. Soldering apparatus according to claim 1, including two parallel extending guide rails.

3. Soldering apparatus according to claim 2, including means to raise and lower both guide rails jointly.

4. Soldering apparatus according to claim 1 wherein said means is operable to tile the guide rail about a horizontal axis located transversely to the direction of conveyance.

5. Soldering apparatus according to claim 2 wherein said raising and lowering means is operable to raise and lower each of the guide rails separately.

6. Soldering apparatus according to claim 2 wherein the holder includes carrying bars located laterally and extending to the front and rear of the holder and extending upwardly from the holders said carrying bars having rollers which are positioned to engage the guide rails when the holder is moved along the path of the region of the guide rails.

7. Soldering apparatus according to claim 1 wherein said raising and lowering means includes at least one lifting bar connected to the guide rail and drive means to raise and lower the lifting bar.

8. Soldering apparatus according to claim 1 wherein said raising and lowering means includes two lifting bars secured to the guide rail at two places which are at a distance from each other in the direction of conveyance and drive means to raise and lower the lifting bars.

9. Soldering apparatus according to claim 8 wherein the guide rails and lifting bars are connected for articulation about axes transverse to the direction of conveyance.

10. Soldering apparatus according to claim 8 wherein the lifting bars can be raised and lowered by said raising and lowering means independently of one another.

11. Soldering apparatus according to claim 3 wherein said means to raise and lower both guide rails is operable to raise and lower both jointly.

12. A soldering machine according to claim 1 including interengageable surfaces on the holder and conveyor that permit relative vertical movement while maintaining driving contact in the direction of conveyance in the region of the guide rail.

13. A soldering machine according to claim 1 wherein each holder includes at least one switching cam and wherein cam operable switches are located adjacent the soldering bath to control the means to raise and lower the guide rail.

14. A soldering machine according to claim 6 wherein said rollers are located at the front and rear portions of each holder and are laterally offset, and the guide rails each have separate parallel-extending guide rail portions, and the said front and rear rollers run on different ones of said separate guide rail portions.

15. A soldering machine according to claim 14, characterized in that the guide rail portions each have run-on ramps.

16. Soldering apparatus according to claim 14, wherein the guide rail portions of each guide rail are relatively movable longitudinally to vary the distance between the run-on ramps.

17. Soldering apparatus according to claim 15, wherein the angles of rise of the run-on ramps of each guide rail are different.

18. In a method of automatically soldering objects, the steps of supporting the objects to be soldered on holders, carrying the holders by a conveyor to a position above and adjacent a bath of molten solder, transferring at least partial control of the movement of selected ones of the holders to a guide rail that extends along the conveying path and along the solder bath while continuing to partially control movement of the selected holders along the path with the conveyor, changing the height of at least a part of the selected holders by moving at least a portion of the guide rail relatively toward the bath to contact the bath with the objects on the selected holders, to effect dip soldering thereon, subsequently moving at least a portion of the guide rail relatively away from the bath to lift the objects on the selected holders from contact with the bath, and moving the objects on the nonselected holders in a trailing fashion through the bath independently of the guide rails to effect touch soldering on the objects on the nonselected holders.

19. Apparatus for automatically soldering objects, comprising: a bath of molten solder holders for supporting objects to be soldered, a conveyor to carry the holders along a path to a position above and adjacent the bath of molten solder, for dragging the objects through the bath to effect touch soldering, a guide rail along the solder bath, means to transfer at least partial motive control only of selected ones of the holders from the conveyor to the guide rail while also controlling movement of the holder along the path with the conveyor, and means to move a portion of the guide rail relatively toward the bath and thereby change the height of at least a part of the selected holders so as to contact the bath with the objects to effect dip soldering and to move at least a portion of the guide rail relatively away from the bath to lift the objects from the dipping contact with the bath, while the nonselected holders remain under sole control of the conveyor to effect touch soldering of the objects carried thereon.

20. An automatic soldering apparatus for soldering objects held in holders, by means of a soldering bath, said apparatus comprising:
a. a conveyor for moving the holders along a path a portion of which is proximate the soldering bath where the objects are brought together and then moved apart, the path established by the conveyor causing the objects to be dragged substantially horizontally through the bath to effect touch soldering operations thereon,
b. a pair of guide rails extending longitudinally in the direction of the path adjacent the bath and spaced laterally apart with respect to the path,
c. support means connected to the guide rails for controllably adjusting the orientation of the guide rails relative to the path, and
d. guide elements attached to a portion of the holders and engageable with the guide rails as the holders move along the path to cause interception by the guide rails of only those holders having the guide elements to enable at least partial subsequent control of movement of the intercepted holders in accordance with the controlled orientation of the guide rails for dipping the objects in the bath to effect dip soldering operations on only the objects held on the intercepted holders, while the nonintercepted holders are controlled solely by the conveyor to effect touch soldering of the objects held thereon.

21. Soldering apparatus as set forth in claim 20 wherein said conveyor includes drive bars extending transversely of the direction of conveyance adjacent the front and rear of each holder, and each holder has support surfaces and drive surfaces at its front and rear portions considered relative to its motion along the carrying path, that are engageable by the drive bars and removable relative thereto in a direction transverse to the direction of conveyance, at least one of said drive surfaces extending in said transverse direction a distance to maintain contact with a drive bar if the conveyor and holder move apart in said transverse direction.

* * * * *

PO-1050
(5/69)

UNITED STATES PATENT OFFICE
CERTIFICATE OF CORRECTION

Patent No. 3,828,419            Dated August 13, 1974

Inventor(s)    Rudolph Wanner

It is certified that error appears in the above-identified patent and that said Letters Patent are hereby corrected as shown below:

Column 1, line 61, delete "a"; before "the" insert -- of --;
Column 2, line 6, "to" should be -- at --;
         line 64, "plane" should be -- plant --;
In the claims:
Column 5, line 6, "tile" should be -- tilt --;
Column 7, line 2, "said" was omitted before "holder" (second occurrence).

Signed and sealed this 19th day of November 1974.

(SEAL)
Attest:

McCOY M. GIBSON JR.           C. MARSHALL DANN
Attesting Officer             Commissioner of Patents